(12) United States Patent
Smith

(10) Patent No.: US 11,337,412 B2
(45) Date of Patent: May 24, 2022

(54) AUTOMATED HORSE SHOEING APPARATUS AND SYSTEM

(71) Applicant: Mark Smith, Tilbury (CA)

(72) Inventor: Mark Smith, Tilbury (CA)

( * ) Notice: Subject to any disclaimer, the term of this patent is extended or adjusted under 35 U.S.C. 154(b) by 256 days.

(21) Appl. No.: 16/429,521

(22) Filed: Jun. 3, 2019

(65) Prior Publication Data

US 2019/0364869 A1  Dec. 5, 2019

Related U.S. Application Data

(60) Provisional application No. 62/679,304, filed on Jun. 1, 2018.

(51) Int. Cl.
| | |
|---|---|
| *A01L 11/00* | (2006.01) |
| *A01L 15/00* | (2006.01) |
| *A01K 1/06* | (2006.01) |
| *G05B 19/4097* | (2006.01) |
| *B21K 15/02* | (2006.01) |
| *A01L 1/00* | (2006.01) |
| *A01L 3/00* | (2006.01) |

(52) U.S. Cl.
CPC ............ *A01L 11/00* (2013.01); *A01K 1/0613* (2013.01); *A01L 15/00* (2013.01); *B21K 15/02* (2013.01); *G05B 19/4097* (2013.01); *A01L 1/00* (2013.01); *A01L 3/00* (2013.01); *G05B 2219/35012* (2013.01)

(58) Field of Classification Search
CPC .......... A01L 11/00; A01L 13/00; A01L 15/00; B21K 15/02; A01J 5/017; A01J 5/0175
USPC .............................. 168/44, 45, 47, 48.1, 48.2
See application file for complete search history.

(56) References Cited

U.S. PATENT DOCUMENTS

| | | | | | |
|---|---|---|---|---|---|
| 980,674 | A | * | 1/1911 | Range | B21K 15/02 59/36 |
| 1,180,400 | A | * | 4/1916 | Hubbart | A01L 11/00 168/47 |
| 1,270,204 | A | * | 6/1918 | Pinegar | A01L 11/00 168/44 |
| 2,523,368 | A | * | 9/1950 | Howe | A01L 15/00 168/48.2 |
| 3,797,228 | A | * | 3/1974 | Kirkpatrick | B21K 15/02 59/37 |

(Continued)

FOREIGN PATENT DOCUMENTS

| | | | |
|---|---|---|---|
| CN | 112616790 A | * | 4/2021 |
| CN | 112931444 A | * | 6/2021 |

(Continued)

*Primary Examiner* — Lisa L Tsang
(74) *Attorney, Agent, or Firm* — The Dobrusin Law Firm, PC

(57) ABSTRACT

A system for automated horseshoeing. The system is a three cell concept generally including a tool change area, a gluing area and a modification area. The system generally include a platform for a horse to stand thereon wherein all working components are contained below. The system is configured so that a horse can stand on said platform and the working components move from hoof to hoof thereby allowing the horse to remain in a neutral standing position during the entire shoeing process without having to bend its ankle. The automated horseshoeing process of the present specification is entirely monitored by a farrier.

9 Claims, 3 Drawing Sheets

(56) References Cited

U.S. PATENT DOCUMENTS

| | | | | | |
|---|---|---|---|---|---|
| 4,776,402 | A | * | 10/1988 | Meikle | A01L 11/00 144/118 |
| 4,867,103 | A | * | 9/1989 | Montalescot | A01J 5/0175 119/14.08 |
| 4,944,147 | A | * | 7/1990 | Finnegan | B21D 7/06 59/49 |
| 5,319,918 | A | * | 6/1994 | Baur | G05B 19/4207 59/36 |
| 6,502,642 | B2 | * | 1/2003 | Ahrens | A01L 11/00 168/45 |
| 7,088,847 | B2 | * | 8/2006 | Craig | G06K 9/00 168/6 |
| 7,596,875 | B2 | * | 10/2009 | Ross | A01L 11/00 168/45 |
| 7,685,801 | B2 | * | 3/2010 | Brisson | A01L 3/02 59/61 |
| 2006/0278407 | A1 | * | 12/2006 | Baldwin | A01L 7/02 168/4 |
| 2008/0257563 | A1 | * | 10/2008 | Huskey | A01L 15/00 168/45 |
| 2008/0271899 | A1 | * | 11/2008 | Kolonia | A01L 11/00 168/17 |
| 2013/0089179 | A1 | * | 4/2013 | Kenny | A61B 6/508 378/62 |
| 2016/0219857 | A1 | * | 8/2016 | Fishman | A01L 1/04 |
| 2017/0258066 | A1 | * | 9/2017 | Stevenson | A01L 3/00 |
| 2018/0001371 | A1 | * | 1/2018 | Rooryck | A01L 1/00 |
| 2018/0028136 | A1 | * | 2/2018 | Manetti | A61B 6/04 |
| 2019/0069533 | A1 | * | 3/2019 | St. John | A01L 15/00 |

FOREIGN PATENT DOCUMENTS

| | | | | |
|---|---|---|---|---|
| DE | 3146648 | A1 | * | 6/1983 ............ A01L 15/00 |
| WO | WO-2017028957 | A1 | * | 2/2017 ............... A01L 1/00 |

* cited by examiner

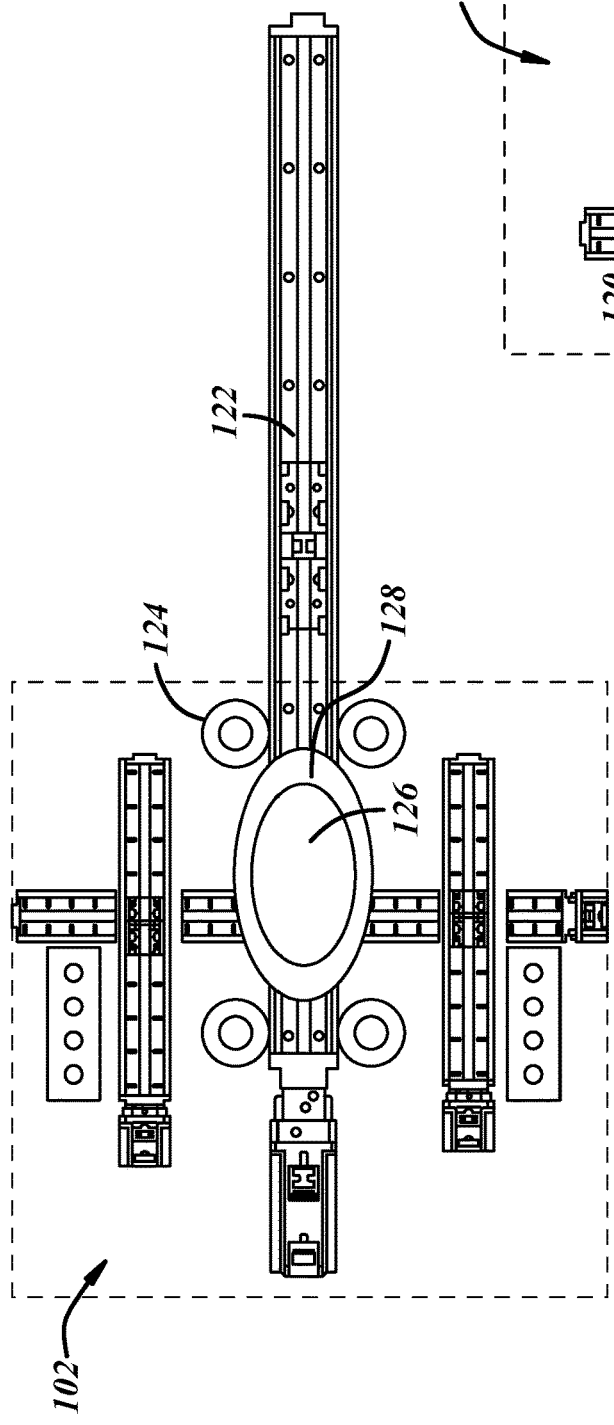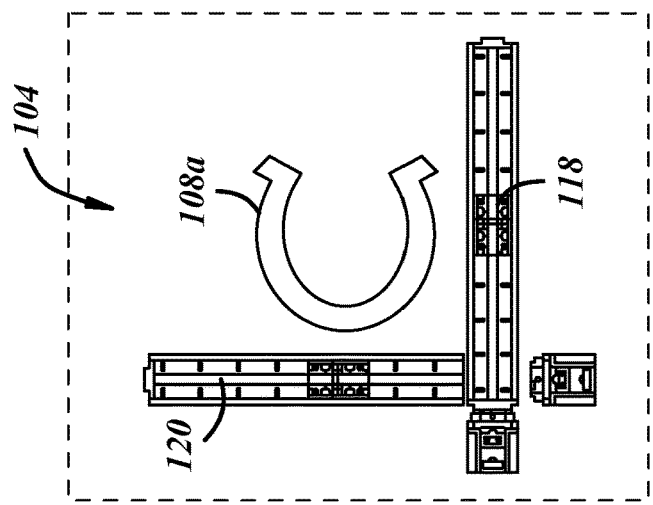

AUTOMATED HORSE SHOEING APPARATUS AND SYSTEM

CROSS REFERENCE TO RELATED APPLICATION

This application claims the benefit of U.S. Provisional Application 62/679,304 filed on Jun. 1, 2018, the contents of which are incorporated herein in its entirety.

TECHNICAL FIELD

The present specification generally relates to horse shoeing system and apparatus and, more specifically, an automated horse shoeing apparatus and system

BACKGROUND

A horseshoe is a fabricated product, normally made of metal, although sometimes made partially or wholly of modern synthetic materials, designed to protect a horse's hoof from wear. Shoes are attached on the palmar surface (ground side) of the hooves, usually nailed through the insensitive hoof wall that is anatomically akin to the human toenail, although much larger and thicker. However, there are also cases where shoes are glued.

The fitting of horseshoes is a professional occupation, conducted by a farrier, who specializes in the preparation of feet, assessing potential lameness issues, and fitting appropriate shoes, including remedial features where required. In some countries, such as the United Kingdom, horseshoeing is legally restricted to only people with specific qualifications and experience. In others, such as the United States, where professional licensing is not legally required, professional organizations provide certification programs that publicly identify qualified individuals. Farriers are required to have sufficient strength to control and manipulate the horse during the showing process. The strength required by farriers dictates that most farriers are men thereby limiting the number of women in the profession despite their often superior skill in calming and controlling horses.

Horseshoes are available in a wide variety of materials and styles, developed for different types of horse and for the work they do. The most common materials are steel and aluminum, but specialized shoes may include use of rubber, plastic, magnesium, titanium, or copper. Aluminum shoes are lighter, making them common in horse racing where a lighter shoe is desired.

It is important to have a horse shod regularly. On average, a visit to the farrier should be scheduled every four to six weeks, even if the shoes are not worn out because the hoof will have grown and need to be trimmed. This process may be expensive but should not be neglected in attempts to save money. Badly fitting shoes can be painful and cause permanent damage. Farriers are trained in their skilled craft and horse shoeing should not be left to a layman.

The general process of horseshoeing is broadly outlined in the following. All of the following steps are conducted by hand in a manual process. None of the traditional steps are automated.

Once the old shoe has been removed, the farrier's first step is to carve away all the loose flakes of horn from the sole. With this done, the length of the hoof wall can be assessed in relation to the sole.

The next step is to trim the wall with a pair of hoof nippers. In this step, the goal is to make both sides of the hoof wall equal in length or to return the sides to the length they were when the horse was last shod. More of the horn usually needs to be removed around the toe, which grows faster than the heel.

The next step includes using a rasp to level out the uneven surfaces caused by any clippers. This is generally a grinding or filing process.

Next, the new shoe itself is formed by hand. A farrier shapes the shoes by hammering it against an anvil. Depending on the material of which the shoe is made, it may need to be heated over a fire or by other flame. The farrier will often check the shoe against the hoof during the shaping process to check to make sure the shoe is properly size to the horse's hoof. Any areas of the horn that would prevent the shoe from fitting properly can then be leveled out with a rasp.

Once the farrier is satisfied with the level and placement, the shoe is nailed or glued in place. The method of attachment depends on the needs of the horse and the tools available to the farrier. Any sharp edges of the on the horseshoe are filed down with the rasp or file, and the hoof wall is rasped where it meets the shoe.

Good shoeing produces a symmetrical hoof, with the inside and outside wall at the same length. The heels of the shoe must be long enough so that the entire bottom of the hoof is protected; if the shoe is slightly larger than the hoof, the hoof will spread to fit it. The process takes time and should not be quick, or cheap, for that matter.

The above is an extremely time consuming process and can only be conducted by a farrier having sufficient strength to control a horse. Accordingly, a need exists for alternative horse shoeing system where a farrier of any size and strength can perform the shoeing and where the process is much less time consuming.

SUMMARY

An automated horse shoeing apparatus and method configured to automatically measure, size, adjust, and attach a shoe to a hooved animal, the apparatus comprising, a first cell configured to adjust the shape of the hoof of an animal, the first cell having a 3D image generator to capture a 3D image of the hoof, a processor then determines the amount of hoof material to remove based on the 3D image, the first cell further configured to adjust the shape of the animal's hoof, a second cell configured to modify a horseshoe based on the 3D image generated in the first cell, and a third cell configured to automatically attached the adjusted horseshoe from the second cell to the hoof of the animal.

The apparatus as described having modification of the hoof in the first cell includes first supporting an outside of the hoof by means of a hoof support and grinding an inside of the hoof and subsequently supporting the inside of the hoof by the hoof support and grinding the outside of the hoof. A rotating grinding apparatus may be used to adjust the shape of the animal's hoof in accordance with the 3D image. Breakaway supports may be to support the ankle of an animal during the shoeing process while also configured to allow to be broken away if the animal is uncomfortable. The cells may be positioned below a platform, the platform configured to allow an animal to stand thereon. A portion of the platform may be configured to be removable so as to expose one or more cells to the animal standing on the platform. Further, the cells may be configured to automatically move to each hoof of the animal. For adjustment, the horseshoe may be adjusted using heat and/or pressure. Further, an imaging device may be included and configured to look internally in the ankle, hoof, leg, and foot of the animal, a processor configured to make adjustments to the hoof and/or the shoe to adjust based on finding from the imaging device.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2 depicts a graphical representation of the tool change or grinding area 102 where the hoof of the horse is machined in accordance with the guidelines as produced by the software according to one or more embodiments shown and described herein;

FIG. 3 depicts a graphical representation of the horseshoe gluing area 104 where the newly modified horseshoe is glued to the hoof of the horse according to one or more embodiments shown and described herein;

DETAILED DESCRIPTION

Figure 1:
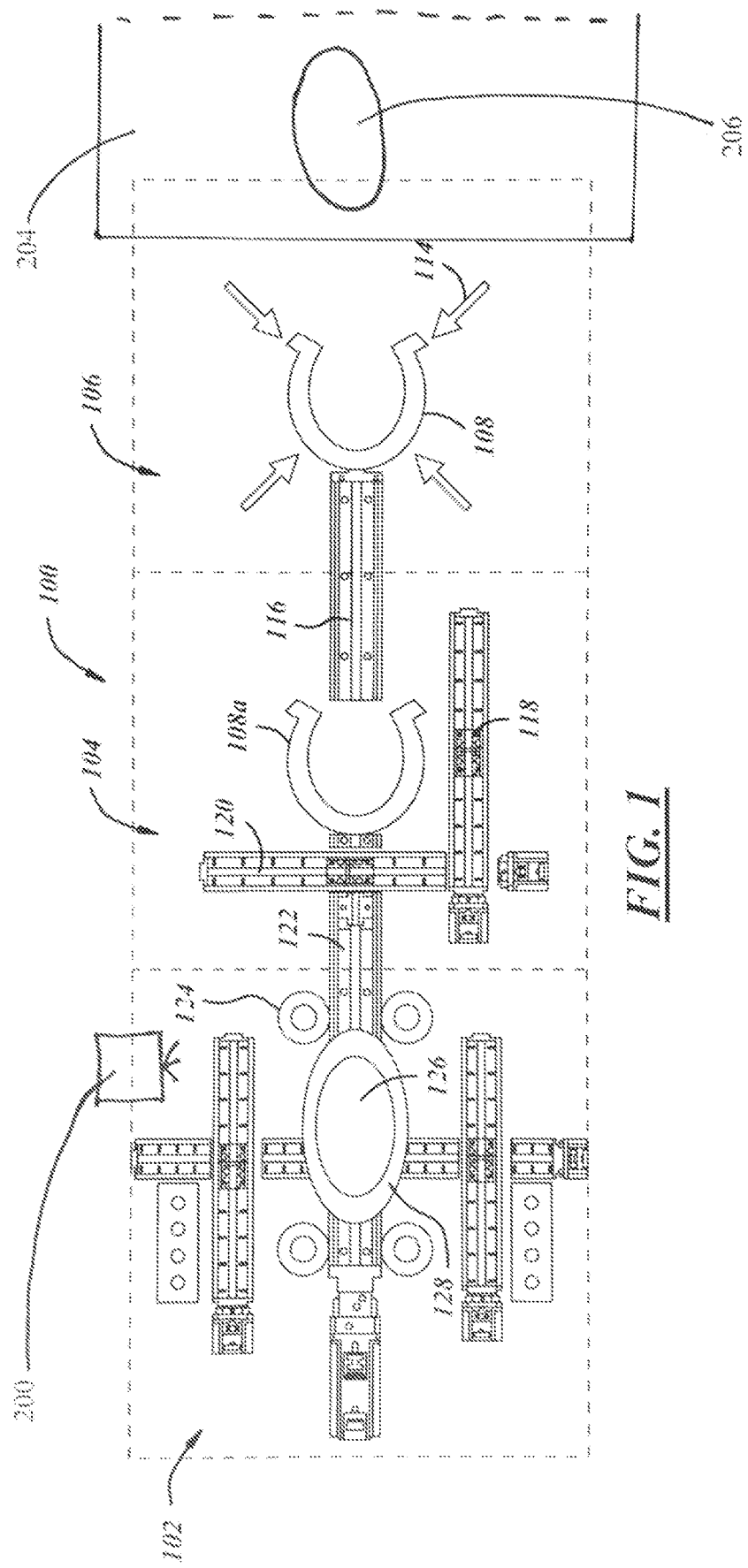
FIG. 1 depicts a graphical representation of the flow of the "areas" during the shoeing process including the tool change area, the horseshoe modification are and the gluing area according to one or more embodiments shown and described herein.

FIG. 1 generally depicts one embodiment of a system for automated horseshoeing. The system is a three cell concept generally including a tool change area, a gluing area and a modification area. The system generally include a platform for a horse to stand thereon wherein all working components are contained below. The system is configured so that a horse can stand on said platform and the working components move from hoof to hoof thereby allowing the horse to remain in a neutral standing position during the entire shoeing process without having to bend it's ankle. The automated horseshoeing process of the present specification is entirely monitored by a farrier. The present system is particularly advantageous in that it allows women and farriers having less strength accurately conduct a horseshoeing procedure and it dramatically expedites the time to shoe a horse.

Referring now to FIG. 1, a system 100 is provided for having a system which is automated for shoeing horses. In the present embodiment, the system 100 is a three cell concept generally including a tool change area 102, a gluing area 104 and a modification area 106. The process initially starts by taking a photograph or other three dimensional image of the hoof of the horse. The 3D image generated may be a photograph or other CAD image taken by one or a plurality of cameras (or 3D image generator 200) surrounding the hoof of the horse from an underside position.

The 3D image created by the cameras or other image capturing technology is then imported into a software system. The software system is configured to specifically determine (1) the specific amount and area of the hoof to grind and/or cut, and (2) to determine the exact specifications of the horseshoe after the hoof has been ground an cut. The software application is loaded with data to determine ideal specifications of the hoof and the final horseshoe. The system simultaneously determines where the hoof should be modified, how much the hoof should be modified, and exact specifications of the final horseshoe.

As soon as the software determines exact specifications for both the hoof and the horseshoe, the system immediately begins modification of the horseshoe.

Similarly, as soon as the software determines how much of the hoof to cut and/or grind, the system 100, specifically the tool change area 102, begins work on cutting and grinding the hoof of the horse. Although the exact series of steps may be modified, the system 100 generally requires first supporting the outside of the hoof by means of the hoof support 128 and grinding the inside of the hoof and subsequently supporting the inside of the hoof by the hoof support 126 and grinding by a rotating grinding apparatus 124 the outside of the hoof. This two-step process allows the hoof to be ground on both the inside and the outside while maintaining constant support of the hoof of the horse. The constant support of the hoof of the horse allows the horse to feel more secure and prevents instability felt by the horse. During the transition between the inside support and outside support 126, 128 respectively, dual support is provided of the supports 126, 128 to minimize the transition felt by the horse.

Simultaneously while the horseshoe is being modified in the horseshoe modification area 106, the hoof of the horse is being ground and/or cut down in the tool change area. While the hoof of the horse is being supported by the supports 126, 128 as discussed above, automatic grinding and cutting, collectively referred to as machining, is occurring in the tool change area 102.

In the present embodiment, the machining is automated in accordance with the guidelines set forth by the software dictating the final required shape of the hoof before the new shoe is positioned thereon. The software system determines exact specifications required of the hoof in connection with the new horseshoe being modified by the system. During the machining process, the system is being over watched by a farrier to insure safety of the horse and accuracy of the system 100.

A plurality of tracks and/or shuttles 116, 118, 120, 122 are positioned within the system to move various components of the system and to transport the horseshoe 108 from the horseshoe modification area 106 to the horseshoe gluing area 104. In the present embodiment, the machining equipment provided is capable of grinding both the inside and the outside of the hoof. Furthermore, the machining provided may also cut the hoof prior to grinding to more efficiently remove large quantities of the hoof. The machining equipment is provided on an X/Y router system thereby allowing the machining equipment to move around and inside of the hoof to access all areas of the hoof in order to accommodate the hoof for the newly modified horseshoe.

Simultaneously while the hoof is being machined at the tool change area 102, the horseshoe is being modified in accordance with the software requirements in the horseshoe modification area 106. The horseshoe modification area bends and shapes a new horseshoe in accordance with the photograph or other imagery taken by a camera. A software program takes the photograph or other imagery, and determines the exact specifications required of the horseshoe to meet to the newly modified horse hoof. The horseshoe 108 is positioned into place by the tracks 116. A plurality of adjustment modules 114A, 114B, 114C, 114D are positioned around the horseshoe 108. The adjustment modules 114A, 114B, 114C, 114D are configured to bend or otherwise modify the horseshoe 108 in accordance with the software guidelines. In the present embodiment, an induction heating coil 112 heats a portion of the adjustment modules 114A, 114B, 114C, 114D so as to move and manipulate the horseshoe 108 allowing it to bend to meet the required specifications. Pressure is also provided against the sides of the horseshoe 108. The adjustment modules 114A, 114B, 114C, 114D are configured to provide pressure against the sides of the horseshoe 108 so as to facilitate bending and modification of the horseshoe 108. The combination of physical force and heat provided by the induction heating coil 112 allow the system to automatically bend and alter the horseshoe 108 in the horseshoe modification area 106. In the present embodiment, the horseshoe modification area includes fewer or more adjustment modules so as to accommodate various horseshoes. Furthermore, each adjustment module 114A, 114B, 114C, 114D includes a contact point for adjustment. The contact point for adjustment directly contacts the side of the horseshoe. Both heat and pressure are communicated to the horseshoe through the contact points for adjustment on the adjustment modules 114A, 114B, 114C, 114D.

Figure 4:
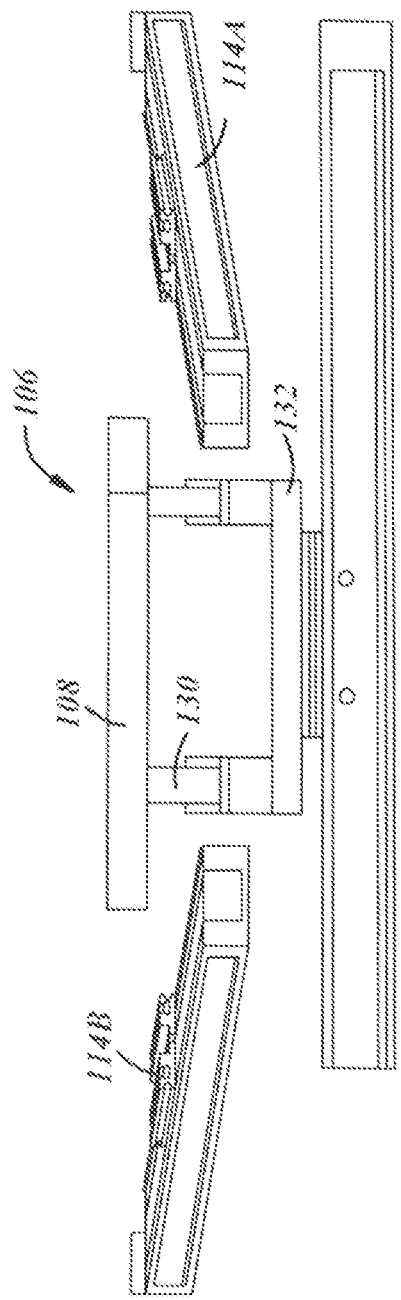
FIG. 4 depicts a graphical representation of the horseshoe shuttle in the adjustment cell 106 where the horseshoe is modified in accordance with the software according to one or more embodiments shown and described herein.
Figure 5:
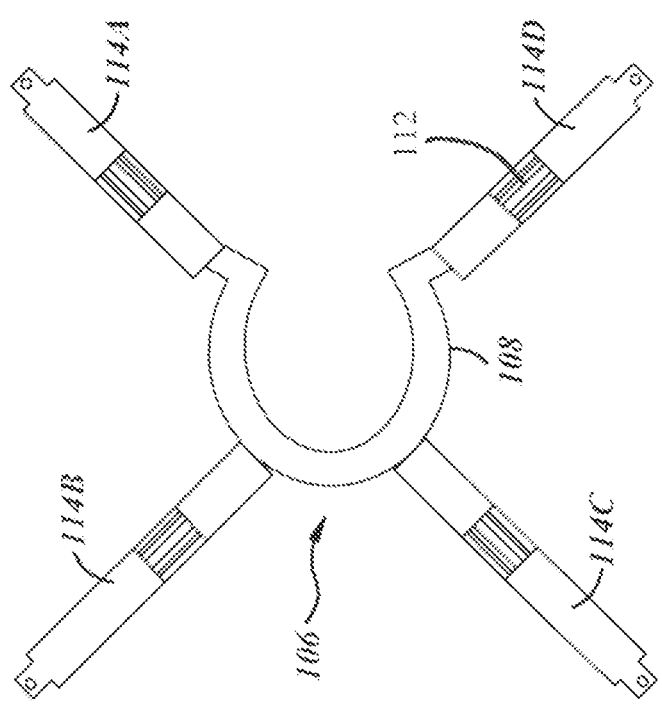
FIG. 5 depicts a graphical representation of a top view of the horseshoe adjustment slides in the adjustment cell 106 where the horseshoe is modified in accordance with the software according to one or more embodiments shown and described herein.

The adjustment modules 114A, 114B, 114C, 114D may be configured to apply a force against a the side of the horseshoe 108 by means of pneumatic actuators configured to apply linear pressure against the side of the horseshoe 108. As illustrated in FIGS. 4 and 5, the horseshoe 108 is positioned on a tooling plate 132 which may be adjusted by the pneumatic actuator 130. These pneumatic actuators 130 work in connection with the actuators of the adjustment modules 114A, 114B, 114C, 114D so as to perfectly position the horseshoe 108 with respect to the adjustment modules 114A, 114B, 114C, 114D. The horseshoe 108 may include positive location holes so as to facilitate bending and twisting at specific locations. In the present embodiment, there are four contact points with no mechanical linkage for adjustments.

The horseshoe gluing area 104 is the last step in the process where the modified horseshoe 108A is glued or otherwise adhered to the horse hoof after modification of the horse hoof in the tool change area 102. The modified horseshoe 108A is securely adhered to the newly modified horse hoof by means of an adhesive in accordance with the needs of the horse.

In most embodiments, the system is large enough to accommodate a horse standing on a platform 204. In other embodiments, all inner workings of the system are disclosed underneath the platform and contained within the inner area. A platform 204 includes a secondary platform (not shown) which slides under and out from the horse's hooves so as to reveal the horse hoof to the system below contained within the inner area. This configuration allows the horse to stand in a normal stance and provides the inner workings of the system to move between each of the horse's four hooves. In this configuration, the horse can stand on the platform without having to move his feet and legs in a bend configuration. Lack of movement of the horse is particularly advantageous in that a farrier does not have to physically move, lift, or bend the horse's leg during the horseshoeing process. Commonly, a farrier must lift the horse's leg to expose the hoof of the horse during the entire horseshoeing process. This requires a significant amount of strength by the farrier during the entire horseshoeing process. The strength required by a farrier frequently limits farriers to being only men or uncommonly strong women. Accordingly, the system of the present specification is particularly advantageous in that it allows women or others with limited strength to work as a farrier.

The platform 204 may include an aperture 206. The aperture exposes the horse's hoof to the system below contained within the inner area. In some embodiments, a secondary platform (not shown) drops out or slides so as to expose the horse's hoof through the aperture.

The platform may include an aperture. The aperture exposes the horse's hoof to the system below contained within the inner area. In some embodiments, a secondary platform (not shown) drops out or slides so as to expose the horse's hoof through the aperture.

Breakaway supports may additionally be used. The breakaway supports are configured to support the ankle of the horse during the horseshoeing process. The supports are primarily made of a strong and resilient metal having a rubberlike, polymer, or polymer like material at the distal end of each support so as to increase the comfort of the horse during the horseshoeing apparatus. If the horse becomes startled or otherwise uncomfortable during the horseshoeing process, the breakaway supports are easily pivoted away from the ankle of the horse. The breakaway supports may also contain sensors to indicate to the system that the horse has removed its hoof. The breakaway supports are provided as a safety measure to both keep the horse's ankle and hoof in place and to easily release if the horse removes its hoof from the system during the process.

A support may be used and configured to support the inside of a horse's hoof during the machining and/or gluing process. The support is positioned on a linear actuator so as to move the support upwards and downwards in accordance with the position of the horse's hoof. The linear actuator may be pneumatic or otherwise motorized so as to move the support in a linear manner. Similarly, an outer support is provided to support the outside of the horse's hoof during machining of the inside of the horse's hoof. The support is also actuated in a linear manner so as to move the support upwards and downwards. In the present embodiment, the support is actuated by a pneumatic actuator to move the support in a linear direction.

The machining apparatus is positioned connected to an arm configured to move in an X/Y/Z configuration. The machining apparatus is configured to either cut or grind both the inside and the outside of the horse's hoof in accordance with the specific parameters as determined by the corresponding software.

As previously discussed, a horseshoe 108 is moved to the horseshoe modification area 106 and is adjusted by a plurality of adjustment modules positioned around the horseshoe 108. The adjustment modules are actuated by pneumatic means. Furthermore, heat is provided to the adjustment modules by means of an induction coil or other heat source as to facilitate moving and bending of the horseshoe 108.

After the horseshoe 108 is modified to its modified state, it is positioned back to the prior cell to be glued to the horse's hoof. The supports are utilized again so as to secure the horseshoe to the horse's hoof by means of an adhesive. Other means of attachment may also be provided.

It is important to understand and recognize that a farrier is still required throughout the entire process of using the system 100 as discussed herein. A farrier is required so as to ensure the safety of the horse and to monitor the system 100 and its correspondence software to ensure accuracy of the machining and horseshoe modification before gluing to the horse's hoof.

It is noted that the terms "substantially" and "about" may be utilized herein to represent the inherent degree of uncertainty that may be attributed to any quantitative comparison, value, measurement, or other representation.

These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination.

It is therefore intended that the appended claims cover all such changes and modifications that are within the scope of the claimed subject matter.

What is claimed is:

1. An automated shoeing apparatus configured to perform a shoeing process to automatically measure, size, adjust, and attach a shoe to a hooved animal having a foot and a corresponding hoof, the apparatus comprising:
    a platform, a plurality of cells positioned below the platform, the platform configured to allow the hooved animal to stand thereon, the platform having an aperture allowing for the foot of the hooved animal to make contact with the plurality of cells positioned below the platform;
    the plurality of cells comprising:
        a first cell configured to adjust the shape of the hoof of the hooved animal, the first cell having a 3D image generator to capture a 3D image of the hoof, a processor then is configured to determine an amount of hoof material to remove based on the 3D image;
        a second cell configured to perform a modification of the shoe to modify the shoe based on the 3D image generated in the first cell; and
        a third cell configured to automatically attach the shoe from the second cell to the hoof of the animal;
    wherein the automated shoeing apparatus is configured so that the hooved animal can stand on said platform and the cells move from hoof to hoof, thereby allowing the hooved animal to remain in a neutral standing position during an entirety of the shoeing process without having to bend its ankle.

2. The apparatus of claim 1 wherein a rotating grinding apparatus is used to adjust the shape of the animal's hoof in accordance with the 3D image.

3. The apparatus of claim 1 wherein the apparatus includes breakaway supports to support the ankle of the hooved animal during the shoeing process, the breakaway supports configured to allow the breakaway supports to be broken away if the animal is uncomfortable.

4. The apparatus of claim 1 wherein at least a portion of the platform is configured to expose one of the plurality of cells to the hooved animal standing on the platform.

5. The apparatus of claim 1 wherein the cells are configured to automatically move to each hoof of the animal.

6. The apparatus of claim 1 wherein the 3D image generator is configured to look internally in the ankle, hoof, leg and foot of the animal, the apparatus configured to make adjustments to the hoof and/or the shoe to adjust the hoof and/or the shoe based on a finding from the imaging device.

7. A shoeing method of operating an automated shoeing apparatus, the method enabling the automated shoeing apparatus to perform a shoeing process to automatically measure, size, adjust, and attach a shoe to a hooved animal having a foot and a corresponding hoof, the shoeing method comprising
    the steps of:
        providing the automated shoeing apparatus of claim 1;
        capturing the 3D image of the hoof;
        determining the amount of hoof material to remove based on the 3D image of the hoof;
        modifying the shoe based on the 3D image generated in the first cell; and
        automatically attaching the shoe from the second cell to the hoof of the animal;
    wherein the method enables the animal to stand on the platform where the cells move from hoof to hoof, thereby allowing the hooved animal to remain in a neutral standing position during an entirety of the shoeing process without having to bend its ankle.

8. The method of claim 7 wherein the shoe is modified by means of applying heat to the shoe itself.

9. The method of claim 7 wherein the shoe is modified by means of applying pressure to the shoe itself.

* * * * *